United States Patent [19]
Soames

[11] 3,781,467
[45] Dec. 25, 1973

[54] METHOD AND APPARATUS FOR MEASURING THE LENGTH OF ELONGATE FEATURES HAVING A SUBSTANTIALLY COMMON ORIENTATION EMPLOYING LINE SCANNING

[75] Inventor: Michael Richard Soames, Fulbourn, England

[73] Assignee: Image Analysing Computers Limited, Melbourn Nr. Royston, Hertfordshire, England

[22] Filed: Apr. 27, 1972

[21] Appl. No.: 248,244

[30] Foreign Application Priority Data
Apr. 28, 1971 Great Britain.................. 11,822/71

[52] U.S. Cl........ 178/6.8, 178/DIG. 36, 235/92 PC, 356/237
[51] Int. Cl.... G01n 21/32, G01n 15/02, H04n 7/18
[58] Field of Search...................... 178/DIG. 36, 6.8; 356/237; 235/92 PC

[56] References Cited
UNITED STATES PATENTS

| | | | |
|---|---|---|---|
| 3,578,906 | 5/1971 | Holmstrom | 178/DIG. 36 |
| 3,451,756 | 6/1969 | Young | 356/257 |
| 3,101,415 | 8/1963 | Libenschek | 178/DIG. 36 |

*Primary Examiner*—Howard W. Britton
*Attorney*—Francis C. Browne et al.

[57] ABSTRACT

A method and apparatus is described for measuring the length of elongate features having a substantially common orientation in which a video signal is obtained by line scanning and measurements are made on the video signal of electrical pulses derived therefrom by detection. Contrary to conventional practice the method of the invention proposes that the field containing the features be orientated so that the features are perpendicular to the direction of line scanning. The length measurement is then obtained by counting the number of line scan intersections with a feature.

5 Claims, 5 Drawing Figures

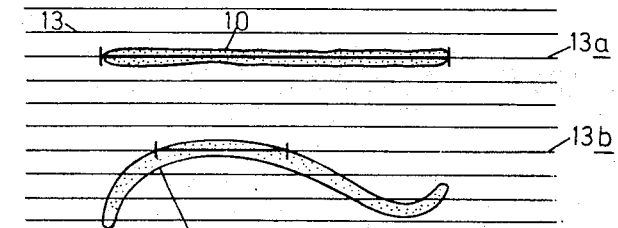
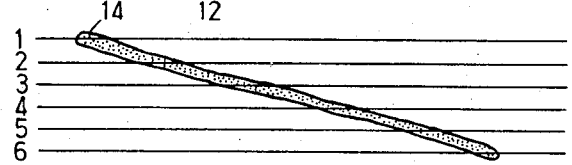
Fig. 2
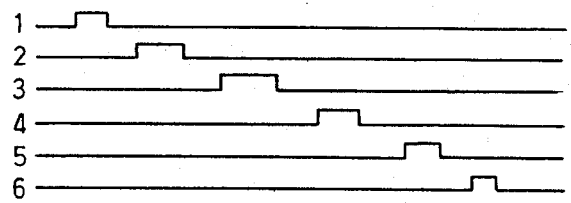
Fig. 3
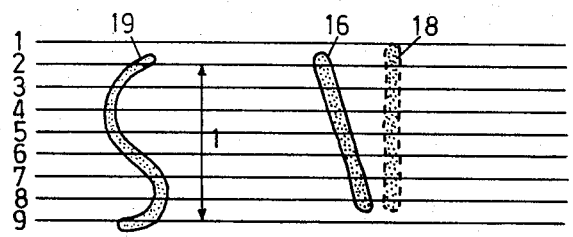
Fig. 4
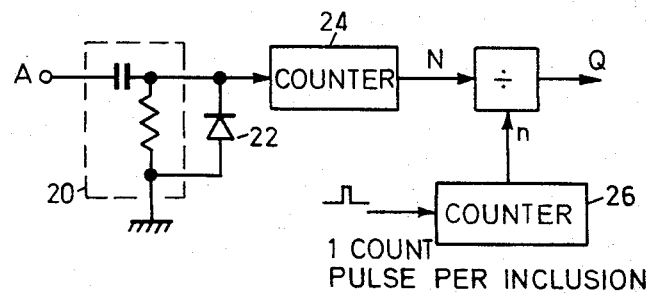
Fig. 5

METHOD AND APPARATUS FOR MEASURING THE LENGTH OF ELONGATE FEATURES HAVING A SUBSTANTIALLY COMMON ORIENTATION EMPLOYING LINE SCANNING

This invention concerns the measurement of the length of elongate features having a substantially common orientation, in which a video signal is obtained by line scanning.

By feature is meant an article or region in a field of view which can be visually distinguished from the surrounding field.

Hitherto it has been usual to arrange that the orientation of the features is parallel with the line scan direction. As the spot scans along a line which intersects a feature, the amplitude of the video signal will suddenly alter as the spot intersects the feature and will remain at a substantially constant new amplitude level while the spot scans the feature. At the other end of the feature the amplitude level will revert to that of the background level until the next feature is intersected. The amplitude excursions of the video signal relating to features can be detected by comparing the video signal amplitude with a reference voltage set between the feature and background levels of the video signal and generating pulses of duration equal to the duration of the excursions which exceed the reference voltage. The duration of each pulse will thus correspond to the length of a line scan intersection with a feature. The pulses constitute a detected signal.

The largest of the line scan intersections for any feature can be selected and size discrimination can be applied to the selected pulses depending on their duration.

In addition various circuits have been devised for associating the detected signal pulses which arise from scanning elongate features which are within a selected distance from each other in the direction of line scan, so as to produce a single detected signal pulse for the two features.

This method of measuring the length of elongate features will only produce accurate results if the features are exactly parallel to the line scan direction. Whereas this can be checked and guaranteed if only one field is to be examined, it cannot be guaranteed if a large number of fields from a single specimen are to be analysed successively and possibly automatically. It will be appreciated that the actual area of a specimen in the field of view of a high power microscope will represent only a small percentage of the total area of the specimen and for a correct analysis of for example the inclusion content in a polished steel specimen, most or all of the area of the specimen has to be analysed and the results for many fields averaged. It is thus important that the method of sizing the features does not suffer from any errors which can arise due to the non-parallelism of the features to the line scan direction.

It is therefore an object of the present invention to provide a method and apparatus for measuring the length of elongate features having a substantially common orientation (such as certain inclusions in polished steel specimens) which allows for a large tolerance (typically ± 10°) in the orientation of the features relative to the line scan direction.

According to one aspect of the present invention a method of analysing elongate parallel features having a substantially common orientation in a field inspected by line scanning comprises the steps of positioning the field so that the orientation of the features is substantially perpendicular to the direction of line scanning, scanning the field, and obtaining a video signal, detecting the amplitude excursions thereof relating to features, generating a single count pulse for each detected signal pulse and counting the count pulses arising from scanning each feature in the field.

Where there is only one feature in the field of view all the line scan intersect pulses arising during a single field scan arise from the one feature and the height thereof is thus equal to the sum of the count pulses.

Where there are two or more features in the field the detected signal pulses for each feature may be isolated by means of a light pen system as described in our co-pending United States Application Ser. No. 248,550.

Where speed is important, an associated parameter computer may be employed as described in British Patent Specifications Nos. 1,264,804 and 1,264,805. By employing this latter arrangement, length information arising during a field scan and corresponding to each feature is associated therewith and released for the feature at a unique instant in time. The output thus comprises a series of information signals each relating to the length of a particular feature in the field. Each information signal can be value discriminated and for example a count pulse for the feature generated only if the signal exceeds a given value. In this way a total feature count for the field can be obtained corresponding to the number of features in the field having a length greater than a given value.

It is not always necessary to know the individual lengths of the features in a field but simply to have a measure of the total length of all features present in the field. An average length for the features can be obtained by simply dividing the total length value by the number of features in the field.

According to a preferred feature of the present invention, a total length signal can be obtained by differentiating the leading (or trailing) edge of each detected signal pulse arising during a field scan and adding all the differentiated pulses so produced. The total count will then represent the total length of all the features in the field.

The invention will now be described by way of example with reference to the accompanying drawings in which;

FIG. 1 illustrates two elongate features lying parallel to the line scan direction, FIG. 2 illustrates on an enlarged scale the intersection of a straight elongate feature by line scans, the feature lying substantially parallel to the line scan direction, FIG. 3 illustrates graphically line scan intersect pulses obtained by detecting video video signal amplitude excursions from the six line scans illustrated in FIG. 2, FIG. 4 illustrates an S-shaped feature and a straight feature lying substantially perpendicular to the line scan direction, and FIG. 5 is a block circuit diagram which illustrates how count pulses are obtained for deriving total and average length signals for features in a field.

A straight elongate feature 10 and an S-shaped feature 12 are shown intersected by a series of parallel scan lines 13. The feature 10 is parallel to the line scan direction and the duration of the detected video signal pulse from line 13a is thus an accurate measure of its length. However, even the longest pulse (on line 13b) from feature 12 will not indicate (even approximately) the overall length of this feature.

A video signal from line scan 13 will contain amplitude variations from a background level (when the scanning spot is not intersecting a feature) to a second substantially constant "feature" level (when the spot is scanning the feature itself. Detection of the resulting video signal amplitude excursions results in a series of electrical pulses, the durations of which are dependent on the length of the features or feature segments producing the original amplitude changes in the video signal. The resulting electrical pulses can be size discriminated by ignoring all those less than or greater than a given duration, as the case may be.

FIGS. 2 and 3 illustrate how errors can arise if the line scan direction is not exactly parallel with the length direction of a straight feature. FIG. 2 illustrates the intersection with a feature 14 which is inclined to the direction of line scan, by six typical, successive line scans. FIG. 3 illustrates the detected signal pulses obtained by detecting the video signal from these six line scans. It will be seen that no single detected pulse bears any relation to the overall length of the feature 14. This is because the line scans intersect the feature at a shallow angle and effectively cut the feature into six separate pieces. If a size discrimination is now applied to the pulses arising on the six line scans shown, and if the discrimination level is set so as to accept pulses equal to or greater than e.g. 50 percent of the length of the feature 14, it will be seen that none of the pulses on the six lines illustrated will proceed to the output. Yet the feature 14 producing the pulses should have been counted as it fulfilled the size criterion.

FIG. 4 illustrates the principle behind the present invention. If the field is orientated so that the features are substantially perpendicular to the direction of line scan, little or no error will occur if the features are sized on the basis of the number of line scans which intersect them.

To this end a single feature 16 is again illustrated and related to nine typical successive line scans in a field. The actual feature is shown inclined to the perpendicular (relative to the line scan direction) and is actually only intersected by line scans two to eight inclusive. Consequently the height of the feature will be taken to be equal to seven line scan spacings. Had the feature 16 been orientated so as to be exactly perpendicular to the direction of the line scans, the feature would have been intersected by line scans one to eight inclusive, as shown by the dotted outline 18. The actual length of the feature 18 is therefore equal to eight line scan spacings.

It will be seen that the error in measuring the length of the feature 16 in this way is thus one line scan spacing in eight. By employing a large number of line scans per field, and ensuring that a typical feature will be intersected by not less than say ten of these lines, the sizing error can therefore be reduced to something of the order of 10 percent.

Also in FIG. 4 is shown an S-shaped feature 19. It will be seen that the length of this feature 1, obtained by counting the number of line scan intersections (i.e. the number of detected signal pulses) is much nearer to its original length than is the duration of the pulse on line 13b from a similar feature 12, when lying horizontally.

If the total and average length for a number of features is required, this can be obtained by the circuit arrangement of FIG. 5.

In FIG. 5 the detected signal pulses are applied to junction A forming the input to a differentiating stage 20. Since the differentiating stage will indiscriminately produce a pulse for any sudden change in amplitude, a diode 22 is provided to eliminate either negative or positive going pulses. In the embodiment shown in FIG. 5 the negative going pulses (arising from the trailing edges of the detected signal pulses) are eliminated and the remaining pulses are applied to a counter 24 which is rendered operable for a single field scan. In the alternative as indicated above the leading edge pulses could be eliminated and the trailing edge pulses counted by reversing the direction of the diode.

During the same scan, a second counter 26 is fed with one count pulse for each feature in the field. A count pulse producing circuit such as is described in British Patent Specification No. 1,264,807 may for example be employed.

At the end of the field scan the output from counter 24 (N) is the total length in the field. If this is divided by the output from counter 26 ($n$) the result (Q) is representative of the average length of the features in the field.

If length information specific to each feature, is required, an associated parameter computer is required such as described in British Patent Specification No. 1,264,805 by which the differentiated count pulses for each detected signal pulse for each feature are related to each other to produce a length measurement signal at the end of scanning of each feature. In this way each feature can be sized separately and a more accurate and detailed analysis of the length of the features in the field can be made.

The invention is of particular application in the analysis of polished steel specimens. Non-metallic inclusions in such a specimen will appear grey or black depending on the material when viewed by incident light under a microscope. Furthermore the shape of the inclusions varies depending on the particular material. Certain oxide inclusions will appear as long strings of separate line segments, the so-called stringers all having a similar orientation so as to be generally parallel. By applying a shape factor criterion to the line scan information from a field containing parallel stringers and other oxide inclusions which are not elongate line segments, detected signal pulses arising from stringer segments can be distinguished from those arising from non-stringer segments. In accordance with the invention the specimen is orientated so that the parallel stringers are perpendicular to the line scan direction. In consequence the advantage of the invention is obtained i.e. slight non-parallelism of the stringers or incorrect specimen orientation produces only very small errors in the length measurements.

I claim:

1. A method of analysing a field of substantially parallel elongated features comprising the steps of,
   scanning the field in a series of parallel equally spaced lines to produce a video signal thereof,
   orientating the field so that the length direction of said features is substantially perpendicular to the direction of line scanning, detecting the amplitude excursions of said video signal which correspond to line scan intersections with said features, generating detected signal pulses from said detected amplitude excursions and, counting the number of said detected signal pulses.

2. A method as set forth in claim 1 further comprising the steps of, counting the number of detected features, and dividing the number of detected signal pulses by the number of features.

3. A method as set forth in claim 1 further comprising the step of isolating the detected signal pulses relating to one feature in the field by means of a light pen.

4. A method as set forth in claim 1 further comprising the steps of, differentiating the detected signal pulses to produce a first pulse corresponding to the leading edge of each detected pulse and a second pulse corresponding to the trailing edge of each detected pulse, removing said first pulses, and counting said second pulses.

5. A method as set forth in claim 1 further comprising the steps of, differentiating the detected signal pulses to produce a first pulse corresponding to the leading edge of each detected pulse and a second pulse corresponding to the trailing edge of each detected pulse, removing said second pulses, and counting said first pulses.

* * * * *